March 28, 1950 A. E. YENSEN ET AL 2,501,925
WEED DESTROYER

Filed Nov. 20, 1945 2 Sheets-Sheet 1

A. E. Yensen
W. Yensen
INVENTORS.

BY
ATTORNEYS.

March 28, 1950  A. E. YENSEN ET AL  2,501,925
WEED DESTROYER

Filed Nov. 20, 1945  2 Sheets-Sheet 2

A. E. Yensen
W. Yensen
INVENTORS.

BY
ATTORNEYS.

Patented Mar. 28, 1950

2,501,925

UNITED STATES PATENT OFFICE 2,501,925

WEED DESTROYER

Arthur E. Yensen and Walter Yensen,
Homedale, Idaho

Application November 20, 1945, Serial No. 629,890

1 Claim. (Cl. 56—26)

This invention relates to agricultural machines, and more particularly to machines of the tractor supported type having means for beating and cutting growing weeds to destroy the weeds.

An important object of the invention is to provide a power operated device of this character embodying a plurality of swinging beaters rapidly rotated to accomplish the purpose of the invention, the swinging beaters being adjustably mounted so that they may operate at various distances above the ground surface.

Still another object of the invention is to provide a device of this character which may be readily and easily attached to a tractor, means being provided for taking off power from the tractor to operate the rotary beaters.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings.

Figure 1:
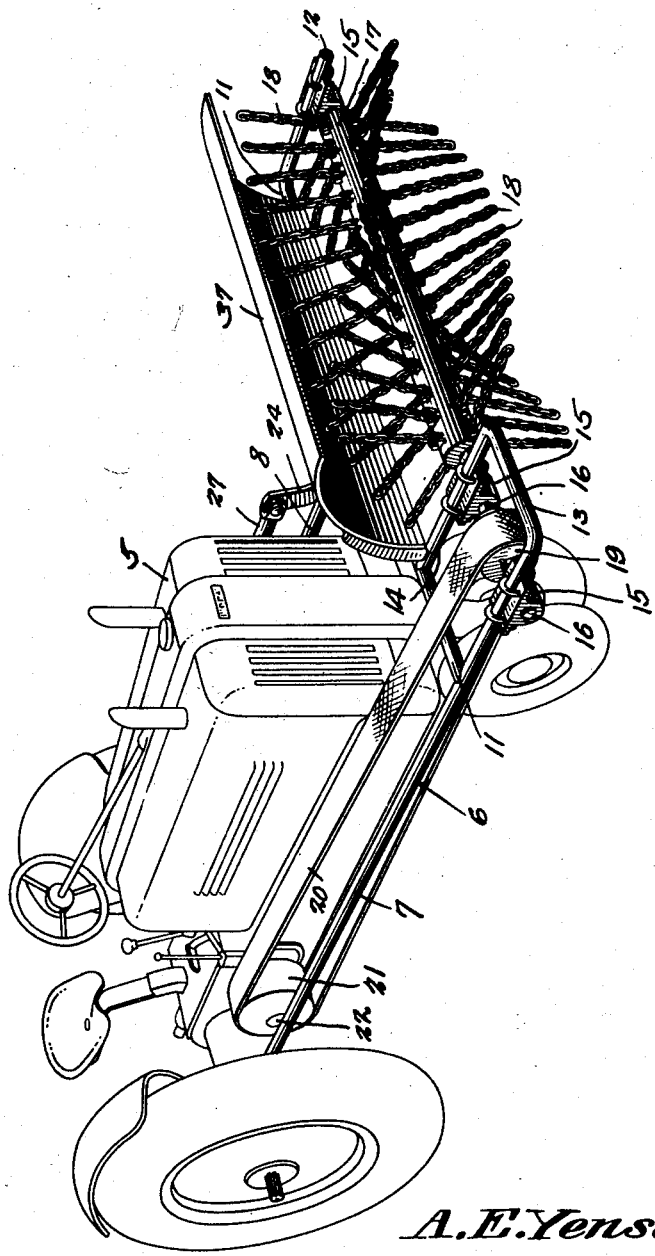
Figure 1 is a perspective view of a tractor equipped with a device constructed in accordance with the invention.

Referring to the drawings in detail, the reference character 5 indicates a tractor to which the frame 6 of the device, is connected.

As shown, the frame 6 embodies tubular side members 7 and 8 which have openings formed at their rear ends, which openings are adapted to accommodate the securing bolts 9 that also pass through openings in the ears 10 formed on the rear axle housing of the tractor, whereby the frame 6 is pivotally mounted.

The tubular side bars 7 and 8 are held in proper spaced relation in respect to each other by means of the transverse member 11 which is connected with the side members 7 and 8 at points adjacent to the forward ends thereof.

One end of the transverse member 11 extends forwardly at right-angles providing an arm 12 while the forward end of the tubular side member 7 extends forwardly beyond the member 11, and then inwardly at 13 towards the arm 12 from where it extends rearwardly at 14 and connects with the transverse member 11. Depending from the arm 12, side member 7 and rearwardly extended portion 14, are identical bearings 15, in which the shaft 16 is mounted, the shaft 16 providing the support for the drum 17 which is secured to the shaft to rotate therewith.

Secured to the drum 17 at one of their respective ends, are lengths of chain 18, which are so mounted that they will swing outwardly, due to the centrifugal force incident to the rotation of the drum 17, to cut and beat weeds in the path of travel of the device.

Mounted on the shaft 16 is a pulley 19 over which the belt 20 operates, the belt 20 also operating over the pulley 21 mounted on the power take-off shaft 22 of the tractor. It might be stated that the rotation of the shaft 16 is in a direction to cause the swinging chains 18 to swing outwardly or rotate in a direction opposite to the direction of travel of the device, with the result that the weeds and vegetation will be cut and broken, and will not be flattened over the ground surface.

Extending laterally from the frame of the tractor 5, is an arm 23 to which one end of the curved arm 24 is pivotally connected, the arm 24 having an elongated opening 25 in which the bolt 26 is positioned, pivotally connecting the arm 24 to the tubular side member 8. Connected with one end of the curved arm 24 is the rod 27 which has a reduced end carrying a piston, which operates in the cylinder 28 that is pivotally mounted on the differential housing 29 of the tractor. A pipe 30 leads to one end of the cylinder and establishes communication between the cylinder and a source of compressed air supply whereby compressed air may be directed to the cylinder to operate the piston and rod 27 to adjust the frame or attachment, vertically regulating the distance between the ends of chains and ground surface over which the machine is moving.

From the foregoing it will be seen that due to the construction shown and described, we have provided an attachment which may be readily and easily mounted on a tractor which will cut and beat growing weeds to destroy them.

Figure 5:
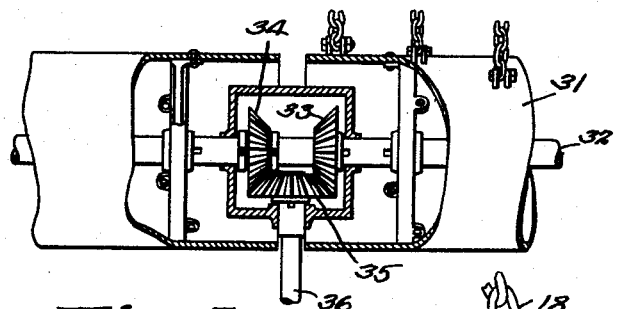
Figure 5 is a fragmental sectional view through a modified form of drum and operating means.
Figure 4:
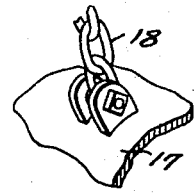
Figure 4 is a fragmental perspective view illustrating the manner of securing the chains to the drum.
Figure 3:
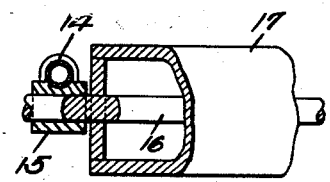
Figure 3 is a fragmental detail view partly in section illustrating the drum and shaft bearing.
Figure 2:
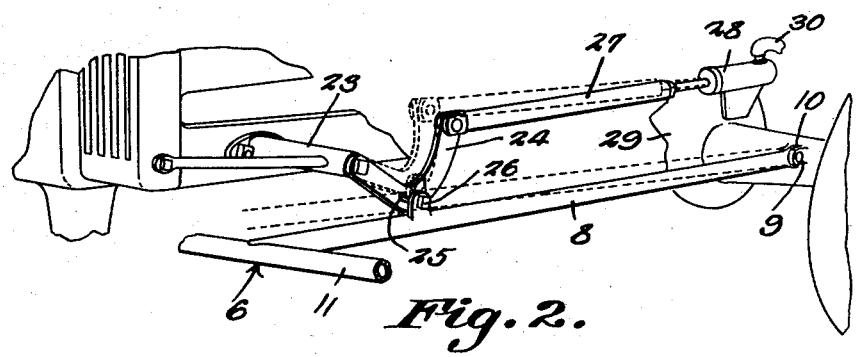
Figure 2 is an elevational view illustrating the means for adjusting the supporting frame of the attachment.

In the form of the invention as shown by Figure 5 of the drawings, the drum is indicated by the reference character 31, and as shown embodies spaced sections, the spaced sections being secured to the drive shaft 32 on which are mounted beveled pinions 33 and 34, the beveled pinion 33 being secured to the shaft 32, while the pinion 34 is loosely mounted on the shaft. Meshing with the pinions 33 and 34 is the power pinion 35 that is secured to the inner end of the power shaft 36 with the result that rotary movement may be transmitted to the sectional drum 31 by means of a power shaft, instead of by the belt and pulley construction shown by Figure 1 of the drawings. Secured to the frame is a curved guard 37 which is in the form of a plate of a length to extend throughout the length of the drum, and of a width to guard the operator of the tractor against weeds which may be thrown upwardly by the chains.

The chains are secured to the drum in spiral formation so that as the drum rotates, the chains will have a sweeping action to cut and beat the weeds with which they contact.

What is claimed is:

A weed destroying attachment for tractors having power take-off pulleys, comprising a frame embodying side members pivotally connected to the rear axle housing of the tractor at opposite sides of the tractor, the forward end of the frame extending beyond the front end of the tractor, a transversely disposed member connecting the side members of the frame, one end of the transversely disposed member being extended forwardly, bearings on the frame and a bearing on said forwardly extended end of the transversely disposed member, a horizontal shaft mounted in the bearings and extending across the frame, a drum mounted on the shaft, chains having one of their respective ends secured to the drum, the opposite ends of the chains being free for outward swinging movement to strike the ground surface, destroying vegetation engaged thereby, a pulley secured to one end of the shaft, a belt operating over the power take-off pulley and pulley on the end of said shaft, rotating the shaft, drum and chains, a curved guard plate secured to the frame and overlying the drum and chains throughout the length of the drum, and means for adjusting the forward end of the frame vertically.

ARTHUR E. YENSEN.
WALTER YENSEN.

REFERENCES CITED

The following references are of record in the file of this patent:

UNITED STATES PATENTS

| Number | Name | Date |
|---|---|---|
| 1,035,056 | Shubert et al. | Aug. 6, 1912 |
| 1,505,572 | McDonald | Aug. 19, 1924 |
| 1,522,378 | McLeod et al. | Jan. 6, 1925 |
| 2,147,884 | Cape | Feb. 21, 1939 |
| 2,238,840 | Weishaar | Apr. 15, 1941 |
| 2,318,409 | Millard et al. | May 4, 1943 |
| 2,341,486 | Swertfeger | Feb. 8, 1944 |
| 2,344,663 | Wood | Mar. 21, 1944 |

OTHER REFERENCES

Richmond Times-Dispatch, June 30, 1944, page 3.